(12) United States Patent
Matsuki et al.

(10) Patent No.: US 9,781,306 B2
(45) Date of Patent: Oct. 3, 2017

(54) IMAGE PROCESSING DEVICE, ARTICLE PROCESSING APPARATUS, AND IMAGE PROCESSING METHOD

(71) Applicant: Kabushiki Kaisha Toshiba, Minato-ku (JP)

(72) Inventors: Hiroshi Matsuki, Yokohama (JP); Naotake Natori, Tachikawa (JP); Mitsutake Hasebe, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/041,544

(22) Filed: Feb. 11, 2016

(65) Prior Publication Data
US 2016/0248937 A1 Aug. 25, 2016

(30) Foreign Application Priority Data
Feb. 17, 2015 (JP) ................. 2015-028887

(51) Int. Cl.
*G06K 9/00* (2006.01)
*H04N 1/48* (2006.01)
(Continued)

(52) U.S. Cl.
CPC ............ *H04N 1/486* (2013.01); *G07D 7/121* (2013.01); *G07D 7/2008* (2013.01);
(Continued)

(58) Field of Classification Search
CPC ........ H04N 1/486; H04N 1/504; H04N 1/484; H04N 1/0282; H04N 1/40056; G07D 7/121; G07D 7/2008
See application file for complete search history.

(56) References Cited

U.S. PATENT DOCUMENTS 6,839,128 B2  1/2005  Premjeyanth et al.
7,218,386 B2  5/2007  Alcock et al.
(Continued)

FOREIGN PATENT DOCUMENTS

EA   011313 B1    2/2009
EP   0 822 705 A2 2/1998
(Continued)

OTHER PUBLICATIONS

Extended European Search Report issued Jul. 13, 2016 in Patent Application No. 16153049.8.
(Continued)

*Primary Examiner* — Aaron W Carter
(74) *Attorney, Agent, or Firm* — Oblon, McClelland, Maier & Neustadt, L.L.P.

(57) ABSTRACT

An image processing device that acquires an image from an object includes an illuminator having a plurality of light sources, a sensor unit, and a controller. The plurality of light sources irradiates light of respectively different colors onto an object. The sensor unit outputs luminance data for one line obtained by photoelectrically converting light is reflected from the object of that was irradiated by the illuminator onto the object. The controller acquires a random number, and acquires luminance data for one line output by the sensor unit, while causing one light source selected from the plurality of light sources based on the acquired random number to emit light.

13 Claims, 12 Drawing Sheets

(51) Int. Cl.
*G07D 7/121* (2016.01)
*H04N 1/40* (2006.01)
*H04N 1/50* (2006.01)
*G07D 7/20* (2016.01)
*H04N 1/028* (2006.01)

(52) U.S. Cl.
CPC ......... *H04N 1/40056* (2013.01); *H04N 1/484* (2013.01); *H04N 1/504* (2013.01); *H04N 1/0282* (2013.01)

(56) References Cited

U.S. PATENT DOCUMENTS

| | | | |
|---|---|---|---|
| 7,737,417 B2 | 6/2010 | Giering et al. | |
| 8,282,222 B2* | 10/2012 | Smits | G02B 26/101 353/85 |
| 8,290,216 B1 | 10/2012 | Blair | |
| 8,430,512 B2* | 4/2013 | Smits | G02B 26/101 353/85 |
| 8,696,141 B2* | 4/2014 | Smits | G02B 26/101 250/234 |
| 2002/0030862 A1 | 3/2002 | Tabata et al. | |
| 2007/0206164 A1* | 9/2007 | Beeson | G03B 21/26 353/94 |
| 2008/0055928 A1* | 3/2008 | Arai | G02B 6/0016 362/609 |
| 2009/0059599 A1* | 3/2009 | Kelsay | H04N 1/02815 362/300 |
| 2009/0096994 A1* | 4/2009 | Smits | G02B 26/101 353/30 |
| 2009/0225213 A1* | 9/2009 | Matsuyama | H04N 5/2256 348/333.01 |
| 2010/0098399 A1* | 4/2010 | Breish | G03B 15/03 396/155 |
| 2010/0128965 A1 | 5/2010 | Blair | |
| 2012/0223477 A1* | 9/2012 | Zylkin | A63F 9/0468 273/146 |
| 2012/0224365 A1* | 9/2012 | Yanai | G09G 3/06 362/231 |
| 2013/0003081 A1 | 1/2013 | Smits | |
| 2013/0004026 A1 | 1/2013 | Blair | |
| 2013/0229669 A1 | 9/2013 | Smits | |
| 2014/0037148 A1 | 2/2014 | Blair | |
| 2014/0232839 A1 | 8/2014 | Blair | |
| 2014/0284457 A1 | 9/2014 | Smits | |
| 2015/0104997 A1* | 4/2015 | Haut | A63H 33/22 446/484 |

FOREIGN PATENT DOCUMENTS

| | | |
|---|---|---|
| EP | 1 250 682 A1 | 10/2002 |
| JP | 5-41793 | 2/1993 |
| JP | 5-304585 | 11/1993 |
| JP | 8-242332 | 9/1996 |
| JP | 2000-358156 | 12/2000 |
| KR | 10-2009-0071618 | 7/2009 |
| RU | 2 401 459 C1 | 10/2002 |
| WO | 2008/143087 | 11/2008 |

OTHER PUBLICATIONS

Office Action issued Mar. 2, 2017, in Korean Patent Application No. 10-2016-0016210.
Decision on Grant of a Patent dated May 18, 2017 in Russian Patent Application No. 2016104868/08 (with English translation).

* cited by examiner

| RANDOM NUMBER VALUES | LIGHT SOURCE TO BE USED |
|---|---|
| 1 | R LIGHT SOURCE |
| 2 | G LIGHT SOURCE |
| 3 | B LIGHT SOURCE |

IMAGE PROCESSING DEVICE, ARTICLE PROCESSING APPARATUS, AND IMAGE PROCESSING METHOD

CROSS-REFERENCE TO RELATED APPLICATION(S)

This application is based upon and claims the benefit of priority from the prior Japanese Patent Application No. 2015-028887, filed on Feb. 17, 2015, the entire contents of which are incorporated herein by reference.

FIELD

Embodiments of the present invention relate to an image processing device, an article processing apparatus, and an image processing method.

BACKGROUND

Some image processing devices are configured to, while changing colors of light sources that irradiate light onto an object such as a sheet, cause line sensors to acquire reflected light of each color from the object. Such image processing devices change colors of light sources at constant sampling intervals. Conventional image processing devices are problematic in that moire occurs due to constant sampling intervals.

DETAILED DESCRIPTION

An embodiment provides an image processing device, an article processing apparatus, and an image processing method in which moire is prevented from occurring.

According to an embodiment, an image processing device that acquires an image from an object includes an illuminator having a plurality of light sources, a sensor unit, and a controller. The plurality of light sources irradiates light of respectively different colors onto an object. The sensor unit outputs luminance data for one line obtained by photoelectrically converting light is reflected from the object of that was irradiated by the illuminator onto the object. The controller acquires a random number, and acquires luminance data for one line output by the sensor unit, while causing one light source selected from the plurality of light sources based on the acquired random number to emit light.

According to the thus configured image processing device, moire is prevented from occurring.

Hereinafter, embodiments will be described with reference to the drawings.

First Embodiment

First, an article processing apparatus according to a first embodiment will be described.

The article processing apparatus includes an image processing device for optically reading an image of an article and processing the read image. The article processing apparatus optically reads an image of an article, and processes the article based on the read image. Examples of sheets as processing targets include sheets such as postal matters (postcards, envelopes, etc.), business forms, and securities (bills, etc.). Note that the processing targets are not limited to sheets, and any articles may be used as long as the surfaces thereof have an image that can be read.

Hereinafter, a sheet processing apparatus for processing a sheet as a processing target (article) will be described as an example of the article processing apparatus.

For example, a sheet processing apparatus as the article processing apparatus reads an image of a sheet, determines where the sheet is to be sorted, based on the read image, and sorts the sheet according to the determination result.

Figure 1:
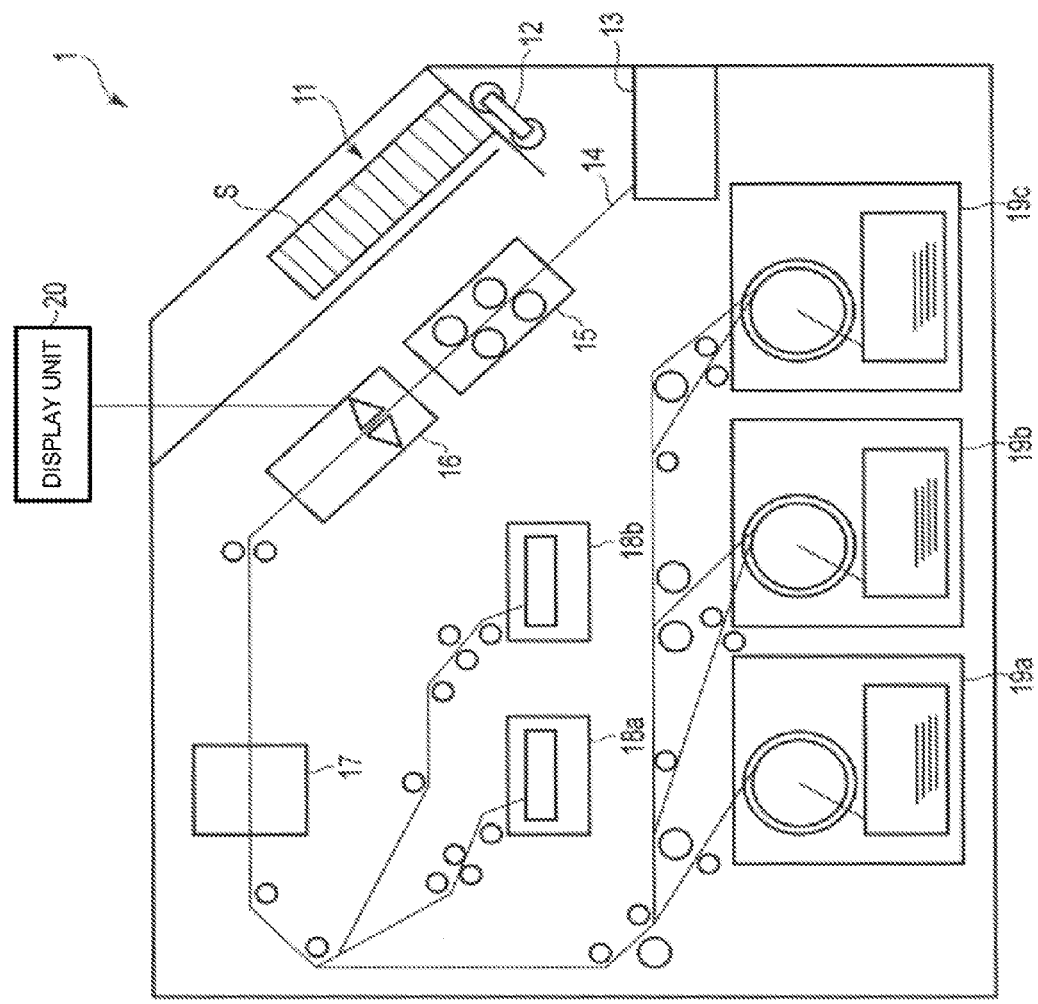
FIG. 1 is a block diagram showing a configuration example of a sheet processing apparatus according to a first embodiment.

FIG. 1 is a block diagram showing a configuration example of a sheet processing apparatus 1 according to this embodiment.

As shown in FIG. 1, the sheet processing apparatus 1 includes a supply unit 11, a take-out unit 12, a foreign material collecting box 13, a conveying unit 14, a pitch adjusting unit 15, an image processing device 16, a bar code reader 17, rejecting units 18a and 18b, stackers 19a, 19b, and 19c, a display unit 20, and the like.

The supply unit 11 supplies a sheet S onto the conveying unit 14. For example, an operator sets a bundle of the sheets S in the supply unit 11. The supply unit 11 accommodates the set bundle of the sheets S. For example, the supply unit 11 supplies the sheets S sheet by sheet, through the operation of the take-out unit 12 positioned at the bottom thereof, onto the conveying unit 14.

The take-out unit 12 takes out the sheet S from the supply unit 11. The take-out unit 12 is positioned at the bottom of the supply unit 11, so that the sheet S that is, under its own weight, in contact with the take-out unit 12 is taken out by the take-out unit 12 from the supply unit 11 onto the conveying unit 14. For example, the take-out unit 12 is configured by a roller for conveying the sheet S, or the like. The take-out unit 12 takes out the sheet S from the supply unit 11 at predetermined intervals based on a signal from a controller of the sheet processing apparatus 1 or the like.

The foreign material collecting box 13 collects foreign material from the supply unit 11. For example, the foreign material collecting box 13 is disposed below the take-out unit 12. If the take-out unit 12 takes out foreign material together with the sheet S, the foreign material collecting box 13 collects the foreign material that falls off the supply unit 11.

The conveying unit 14 conveys the sheet S taken out by the take-out unit 12, to various units. For example, the conveying unit 14 conveys the sheet S to the pitch adjusting unit 15, the image processing device 16, the bar code reader 17, and the like. Furthermore, the conveying unit 14 conveys the sheet S to the rejecting unit 18a or 18b, or the stacker 19a, 19b, or 19c, for example, based on a signal from the controller of the sheet processing apparatus 1 or the like.

The conveying unit 14 is configured by, for example, a conveyer belt for trapping the sheet S, driving rollers for driving the conveyer belt, a driving motor for rotating the driving rollers, and/or a lever for changing the conveying direction, and the like. The conveyer belt is wound around the plurality of driving rollers, and operates in accordance with the driving rollers driven by the driving motor. Furthermore, a plurality of conveyer belts may be provided such that the sheet S supplied from the supply unit 11 is sandwiched therebetween. That is to say, the conveying unit 14 can convey the sheet S supplied by the supply unit 11, at a constant speed, while sandwiching the sheet S between the plurality of conveyer belts.

The pitch adjusting unit 15 adjusts a pitch of the sheets S such that the sheets S conveyed by the conveying unit 14 are arranged at constant intervals. Note that the pitch adjusting unit 15 may also be realized as a function of the conveying unit 14.

The image processing device 16 determines the authenticity or the denomination of the sheet S conveyed by the conveying unit 14. The image processing device 16 optically reads the sheet S using a line sensor, and determines the authenticity or the denomination of the sheet S based on the read result. For example, the image processing device 16 determines the value of the sheet S as the denomination. The image processing device 16 will be described later in detail.

The bar code reader 17 reads a bar code from the sheet S conveyed by the conveying unit 14. The bar code may indicate, for example, the denomination or the like of the sheet S.

The rejecting units 18 collect sheets S determined by the image processing device 16 to be not genuine or fit, sheets S whose denomination was failed to be determined by the image processing device 16, and the like. For example, the rejecting unit 18a may first collect such sheets S. The rejecting unit 18b may then collect the sheets S after the rejecting unit 18a has collected a predetermined amount of such sheets S. It is also possible that the rejecting units 18a and 18b alternately collect the sheets S.

The stackers 19 store the sheets S determined by the image processing device 16 to be genuine and fit. Furthermore, the stackers 19 store the sheets S according to the denomination determined by the image processing device 16. In this example, the sheet processing apparatus 1 includes the stackers 19a to 19c. The stackers 19a to 19c respectively store the sheets S of different denominations. There is no particular limitation on the number of stackers included in the sheet processing apparatus 1 and the denominations separately stored by the stackers.

The display unit 20 displays various types of information, based on a signal from the image processing device 16. For example, the display unit 20 displays an image of the sheet S that is being investigated by the image processing device 16, an investigation result, and/or the like. Furthermore, the display unit 20 may display various types of information, based on a signal from the controller of the sheet processing apparatus 1 or the like. The display unit 20 is, for example, a liquid crystal display or the like.

The sheet processing apparatus 1 may include other necessary constituent elements as appropriate. Furthermore, the sheet processing apparatus 1 may not include unnecessary constituent elements as appropriate.

Next, the image processing device 16 will be described.

Figure 2:
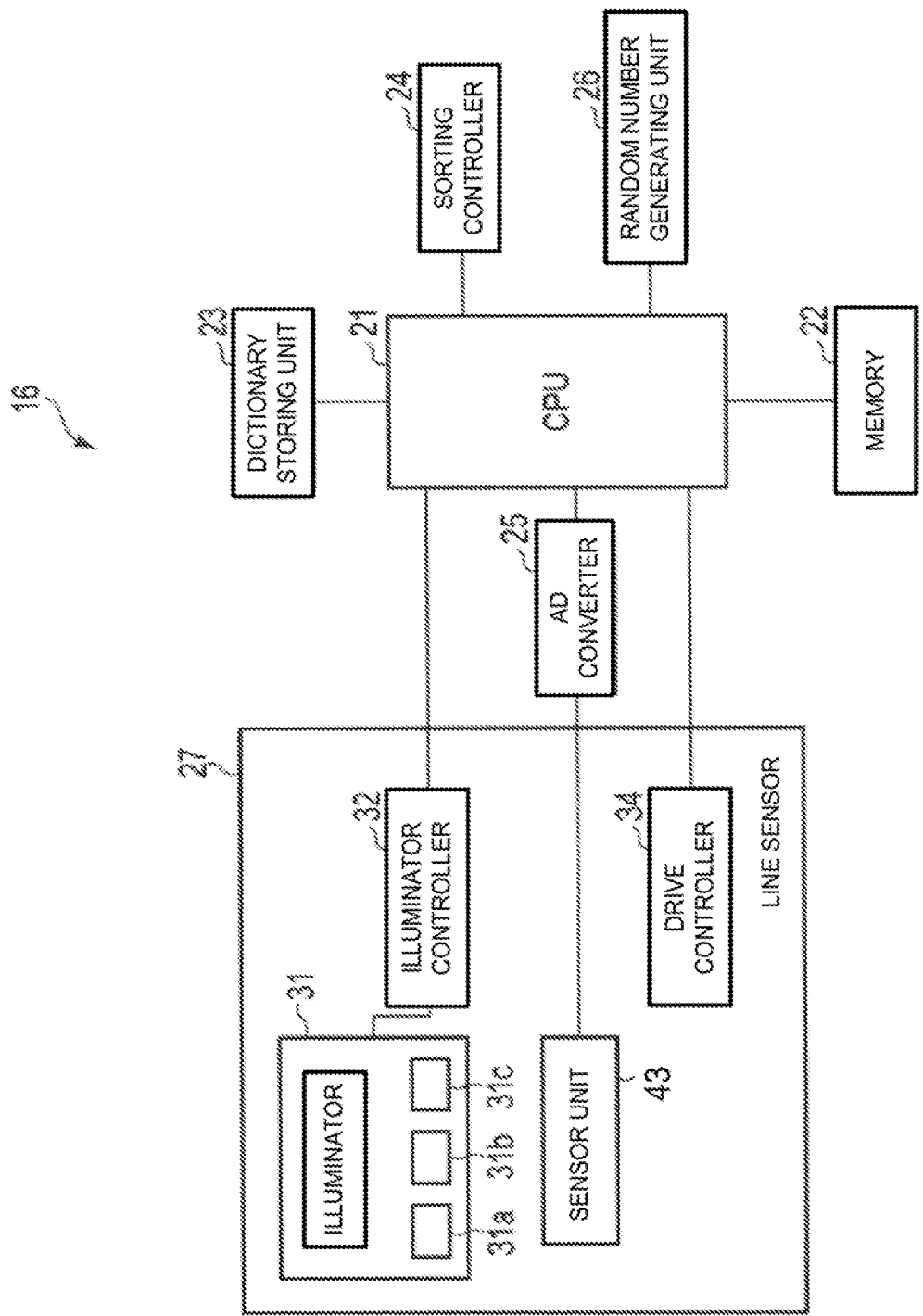
FIG. 2 is a block diagram showing a configuration example of an image processing device according to the first embodiment.

FIG. 2 is a block diagram showing a configuration example of the image processing device 16.

As shown in FIG. 2, the image processing device 16 includes a CPU 21, a memory 22, a dictionary storing unit 23, a sorting controller 24, an AD convertor 25, a random number generating unit 26, a line sensor 27, and the like. In the image processing device 16, the CPU 21 is connected via a bus line such as an address bus or a data bus to the memory 22, the dictionary storing unit 23, the sorting controller 24, the AD convertor 25, the random number generating unit 26, and the line sensor 27.

The CPU 21 has a function of controlling the overall operation of the image processing device 16. The CPU 21 may include an internal cache, various interfaces, and the like. The CPU 21 realizes various processes by executing programs stored in advance in the internal memory or the memory 22.

Note that part of the various functions realized by the CPU 21 executing programs may be realized by a hardware circuit. In this case, the CPU 21 controls the functions executed by the hardware circuit. The CPU 21 may be part of the controller of the sheet processing apparatus 1. Furthermore, the CPU 21 may operate also as the controller of the sheet processing apparatus 1. In this example, it is assumed that the CPU 21 operates also as the controller of the sheet processing apparatus 1.

The memory 22 (luminance data storing unit) stores data necessary for the CPU 21 to realize various functions. For example, the memory 22 is configured by a ROM, a RAM, an NVM, and the like.

The ROM is a non-volatile memory in which control programs, control data, and the like are stored in advance. The control programs and control data stored in the ROM are recorded in advance according to the specification of the image processing device 16. The ROM stores, for example, a program (e.g., BIOS) for controlling the circuit board of the image processing device 16, and the like.

The RAM is a volatile memory. The RAM temporarily stores data that is being processed by the CPU 21, and the like. The RAM stores various application programs, based on a command from the CPU 21. The RAM may store data necessary to execute the application programs, execution results of the application programs, and the like.

The NVM is a non-volatile memory to which data can be written and re-written. Examples of the NVM include an EEPROM (electrically erasable programmable read-only memory), an HDD (hard disc drive), an SSD (solid state drive), and the like. The NVM stores control programs, application programs, and various types of data, according to the operation purpose of the image processing device 16. Furthermore, the NVM stores data generated by the CPU 21 executing various processes.

Furthermore, the memory 22 stores a light source table. The light source table will be described later.

The dictionary storing unit 23 stores dictionaries (dictionary data) for determining the authenticity of the sheet S or the denomination of the sheet S. For example, the dictionary storing unit 23 stores images of respective denominations as the dictionaries. Furthermore, the dictionary storing unit 23 may store distributions of characteristic amounts relating to images of respective denominations, as the dictionaries.

The dictionary storing unit 23 stores dictionaries corresponding to the denominations determined by the CPU 21. For example, if the CPU 21 determines three types of denominations, the dictionary storing unit 23 stores dictionaries corresponding to the three types of denominations.

In the production or the like of the sheet processing apparatus 1, the dictionaries are written to the dictionary storing unit 23. Furthermore, the dictionaries may be updated or new dictionaries may be added to the dictionary storing unit 23 during the operation of the sheet processing apparatus 1. The dictionary storing unit 23 may be disposed in the memory 22.

The sorting controller 24 conveys the sheet S to a predetermined destination of the sheet S, according to a signal from the CPU 21. For example, the sorting controller 24 controls the conveying unit 14 so as to convey the sheet S to the rejecting unit 18a or 18b, or the stacker 19a, 19b, or 19c. For example, the sorting controller 24 controls the lever or the like of the conveying unit 14 to control the conveyance of the sheet S.

Note that the sorting controller 24 may instruct an upper-level controller (e.g., the controller of the sheet processing apparatus 1 if the CPU 21 and the controller of the sheet processing apparatus 1 are separated, etc.) or the like where sheet S is to be conveyed.

The AD convertor 25 converts an analog signal from the line sensor 27 into a digital signal. For example, the AD convertor 25 is connected to a sensor unit 43, and converts an output voltage of the sensor unit 43 into a digital signal. That is to say, the AD convertor 25 converts luminance detected by the sensor unit 43 into a digital signal.

The random number generating unit 26 generates a uniform random number, according to a signal from the CPU 21. For example, the random number generating unit 26 generates a random number using a predetermined random number generating method. For example, the random number generating unit 26 uses the midsquare method, the linear congruential method, or the like. Furthermore, the random number generating unit 26 may be a hardware random number generator. There is no particular limitation on the method using which the random number generating unit 26 generates a random number.

Note that the random number generating unit 26 may be realized as a function of the CPU 21.

The line sensor 27 acquires an image for one line, from the sheet S that is being conveyed by the conveying unit 14. That is to say, the line sensor 27 outputs luminance data for one line obtained by photoelectrically converting light reflected from an object.

The line sensor 27 is fixed under the conveying path of the conveying unit 14. The line sensor 27 acquires an image from the sheet S that is being conveyed over the line sensor 27. That is to say, the line sensor 27 acquires an image in units of one line from the sheet S that is being conveyed by the conveying unit 14 at a predetermined speed.

As shown in FIG. 2, the line sensor 27 includes an illuminator 31, an illumination controller 32, the sensor unit 43, a drive controller 34, and the like.

The illuminator 31 irradiates light onto the sheet S that is being conveyed by the conveying unit 14. The illuminator 31 irradiates light onto an irradiation area that is at least larger than a reading area of the sensor unit 43. That is to say, the illuminator 31 has an irradiation area that is larger than a reading area of the sensor unit 43 in the shape of a line.

The illuminator 31 emits a plurality of types of light respectively having different wavelengths. For example, the illuminator 31 emits red (R) light, green (G) light, and blue (B) light. The illuminator 31 is constituted by a plurality of light sources that irradiate different types of light. In this example, the illuminator 31 includes an R light source 31a (first light source) for emitting red light, a G light source 31b (second light source) for emitting green light, and a B light source 31c (third light source) for emitting blue light.

For example, the illuminator 31 may be constituted by LEDs or the like arranged parallel to the sensor unit 43, as the light source.

The illumination controller 32 controls the illuminator 31, based on a signal from the CPU 21. For example, the illumination controller 32 turns on one of the R light source 31a, the G light source 31b, and the B light source 31c of the illuminator 31, based on a signal from the CPU 21. Furthermore, the illumination controller 32 may control the luminescence intensity of the illuminator 31.

The sensor unit 43 accumulates electric charges according to light irradiated thereon, and outputs a voltage corresponding to the accumulated electric charges. The illuminator 31 irradiates light onto the sheet S, the irradiated light is reflected from the sheet S and the sensor unit 43 is irradiated with light reflected form the sheet S. That is to say, the sensor unit 43 converts the light that is reflected from the sheet S of the light that was irradiated by the illuminator 31 onto the sheet S, into a voltage, and outputs the voltage.

The drive controller 34 drives the line sensor 27, based on a signal from the CPU 21. For example, the drive controller 34 powers on the line sensor 27, based on a signal from the CPU 21.

Next, a configuration example of the line sensor 27 will be described.

Figure 3:
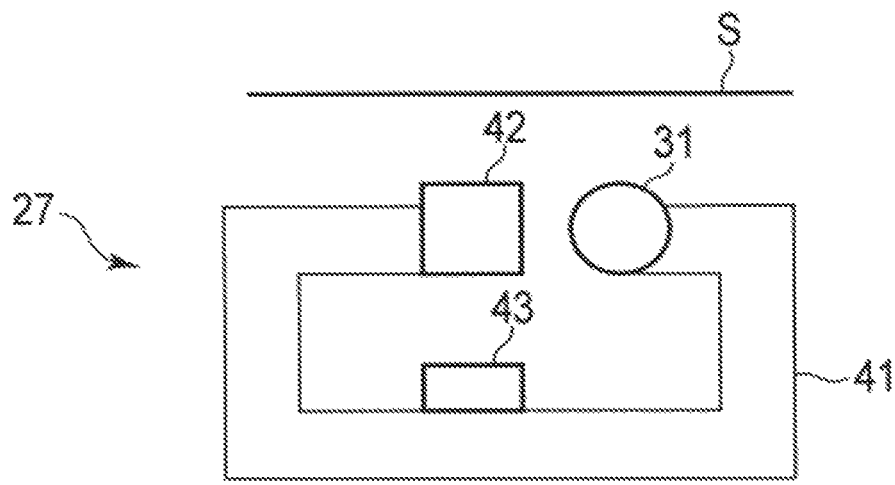
FIG. 3 is a view showing a configuration example of a line sensor according to the first embodiment.

FIG. 3 is a view showing a configuration example of the line sensor 27.

As shown in FIG. 3, the line sensor 27 includes the illuminator 31, a casing 41, a lens 42, the sensor unit 43, and the like.

The line sensor 27 is disposed under the conveying path of the conveying unit 14. The line sensor 27 acquires an image of the sheet S that is being conveyed by the conveying unit 14. That is to say, the line sensor 27 acquires an image of the sheet S when the sheet S passes over the line sensor 27.

The casing 41 is a frame forming the line sensor 27. The casing 41 may form the contour of the line sensor 27. The casing 41 is formed so as to accommodate the sensor unit 43. The casing 41 may be made of metal, plastic, or the like.

The casing 41 includes the illuminator 31 and the lens 42 at a side facing the sheet S. The illuminator 31 is disposed on the casing 41 so as to be capable of irradiating light onto the sheet S. The lens 42 is disposed on the casing 41 so as to be capable of receiving light reflected from the sheet S.

The lens 42 allows the light reflected from the sheet S to transmit therethrough, and forms an image of the reflected light on the sensor unit 43. That is to say, the lens 42 forms an image of the reflected light on photoelectric transducers 33 included in the sensor unit 43. The lens 42 may be configured by a plurality of lenses that are arranged along the photoelectric transducers 33, or by a lens in the shape of a line. Furthermore, the lens 42 may be configured by a plurality of lenses that overlap one on top of another.

The sensor unit 43 converts the light reflected from the sheet S into a voltage. The sensor unit 43 is configured by a plurality of photoelectric transducers 33 that are arranged in a line.

Figure 4:
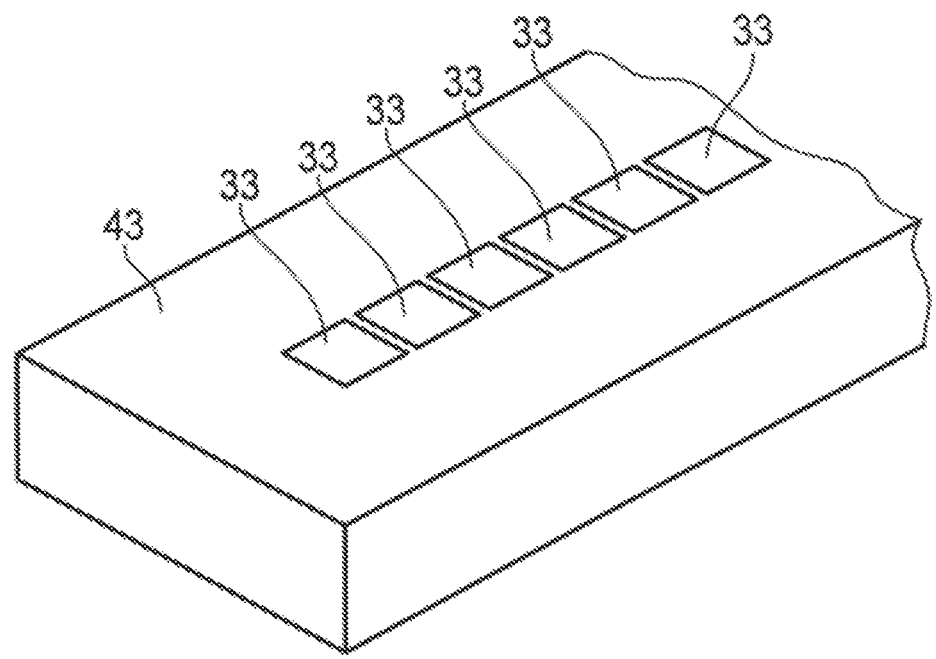
FIG. 4 is a view showing a configuration example of a sensor unit according to the first embodiment.

FIG. 4 is a view showing a configuration example of the sensor unit 43.

As shown in FIG. 4, the sensor unit 43 is configured by a plurality of photoelectric transducers 33 that are arranged in a line.

The plurality of photoelectric transducers 33 of the sensor unit 43 are arranged so as to be orthogonal to a direction in which the sheet S passes. Furthermore, the plurality of photoelectric transducers 33 of the sensor unit 43 are arranged over a range that is longer than the width of the sheet S that passes.

The sensor unit 43 receives reflected light in units of one line from the sheet S when the sheet S passes over the sensor unit 43.

Note that the line sensor 27 may include a contact glass and the like between the sheet S and the casing 41.

Next, a light source table will be described.

Figures 5, 6:
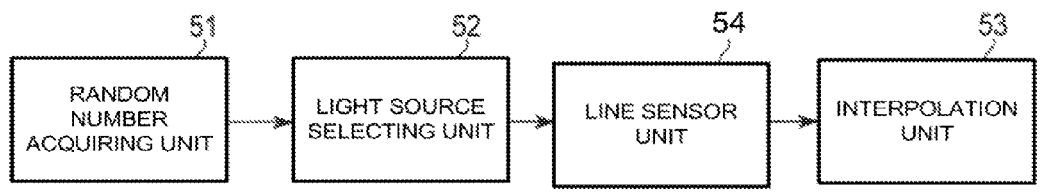
FIG. 5 is a view showing a configuration example of a light source table according to the first embodiment.
FIG. 6 is a block diagram showing an operation example of the image processing device according to the first embodiment.

FIG. 5 is a view showing a configuration example of a light source table.

The light source table is a data table for selecting a light source corresponding to a random number. For example, the light source table is stored in the memory 22. In the example shown in FIG. 5, the light source table has random number values and light sources in association with each other.

Each of the random number values is information for selecting one light source from a plurality of types of light sources. In the configuration example shown in FIG. 2, there are three light sources. If there are three types of light sources, the random number value is one of the values 1 to 3 (or a value that is to be converted to one of 1 to 3). The random number values are generated by the random number generating unit 26.

In the example shown in FIG. 5, the random number values "1", "2", and "3" are respectively associated with "R light source 31a", "G light source 31b", and "B light source 31c". For example, if the random number value is "1", the CPU 21 selects "R light source 31a" and causes the R light source 31a to emit light.

Next, the functions realized by the CPU 21 will be described.

FIG. 6 is a block diagram illustrating the functions realized by the CPU 21.

First, the CPU 21 has a function (a random number acquiring unit 51) of acquiring a random number, using the random number generating unit 26. The random number is a value in the range corresponding to the number of light sources included in the illuminator 31. In this example, since the illuminator 31 includes three light sources, the random number generating unit 26 generates one of the values 1 to 3 at random (generates a random number).

Each time an image for one line is acquired from the sheet S, the CPU 21 acquires a random number. In this example, it is assumed that the distance between lines is L. Accordingly, the CPU 21 acquires a random number using the random number generating unit 26, each time the sheet S moves by L.

Furthermore, the CPU 21 has a function (a light source selecting unit 52) of selecting a light source for emitting light, based on the acquired random number. That is to say, the CPU 21 selects a light source corresponding to the acquired random number, based on the light source table.

For example, if "1" is acquired as the random number from the random number generating unit 26, the CPU 21 selects the R light source 31a, as the light source for emitting light.

Furthermore, the CPU 21 has a function (a line sensor unit 54) of acquiring an image for one line using the line sensor 27, while causing the selected light source to emit light. The line sensor 27 acquires luminance (image) data for one line, based on a signal from the CPU 21, in a state where the selected light source is emitting light.

The CPU 21 stores the acquired luminance data, in the memory 22. That is to say, each time the line sensor 27 acquires luminance data for one line, the CPU 21 stores the acquired luminance data in the memory 22. The memory 22 stores luminance data for a plurality of lines.

For example, the CPU 21 causes the selected light source to emit light, using the illumination controller 32 of the line sensor 27. The photoelectric transducers 33 receive the reflected light from the sheet S of the light that was irradiated by the selected light source onto the sheet S. The photoelectric transducers 33 generate a voltage according to the received light reflected from the sheet S, and the sensor unit 43 applies the generated voltage to the AD convertor 25. The AD convertor 25 converts the applied voltage into a digital signal, and transmits the converted digital signal to the CPU 21. The CPU 21 receives the digital signal from the AD convertor 25, and acquires luminance (image) data for one line.

The CPU 21 repeats the above-described operation each time the sheet S moves by the distance L, thereby acquiring luminance (image) data for each line. The CPU 21 repeats the above-described operation until the trailing edge of the reading area on the sheet S passes over the reading position of the line sensor 27, and acquires image data of the reading area on the sheet S.

Figure 7:
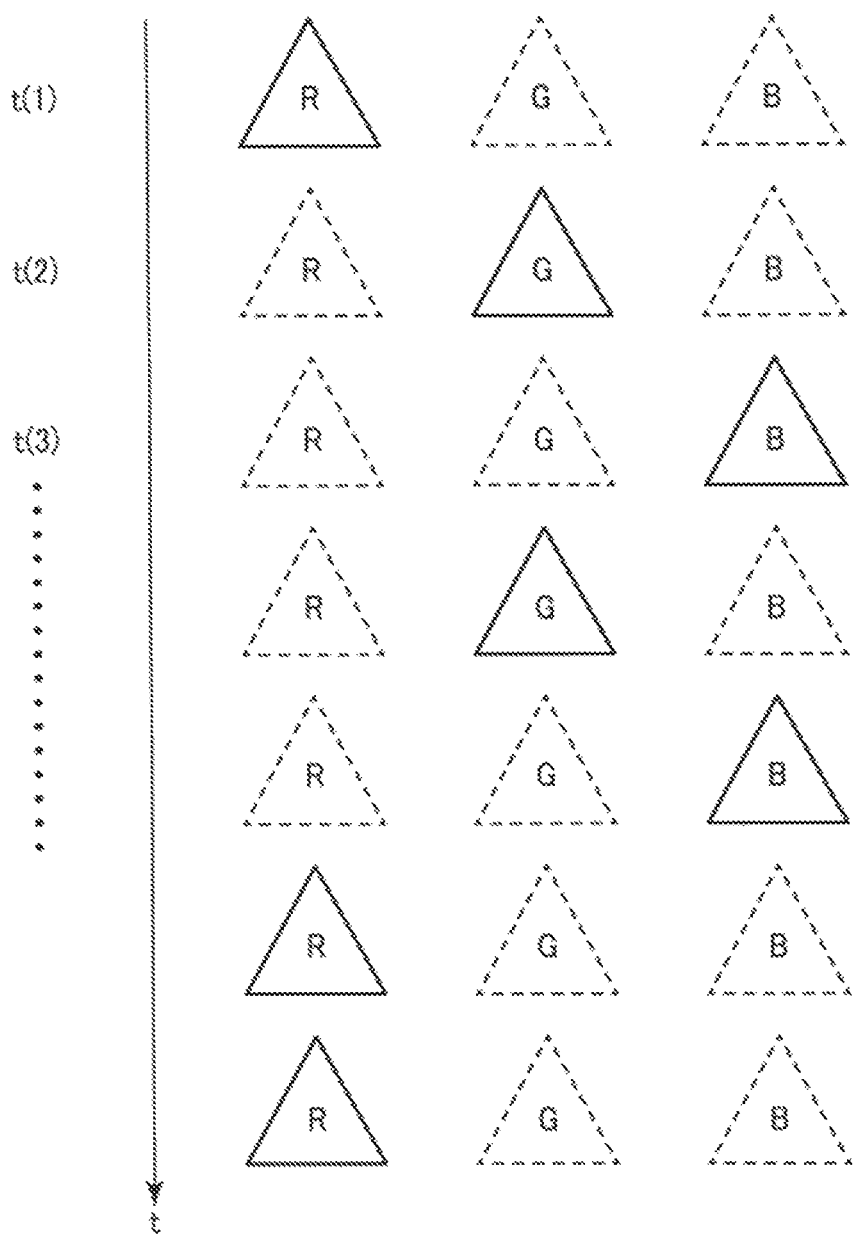
FIG. 7 is a sequence diagram showing an operation example of an illuminator according to the first embodiment.

FIG. 7 is a diagram showing a light source that emits light, in the illuminator 31 of the line sensor 27.

The vertical axis indicates the time that has elapsed, where a lower point on the axis indicates that a longer time has elapsed. The horizontal axis indicates which light source has emitted light. R, G, and B respectively indicate the R light source 31a, the G light source 31b, and the B light source 31c. A mark indicated by the solid line indicates that the corresponding light source has emitted light. A mark indicated by the broken line indicates that the corresponding light source has not emitted light.

For example, FIG. 7 shows that, at a time t(1), the R light source 31a has emitted light, and the other light sources have not emitted light. Furthermore, FIG. 7 shows that, at a time t(2), the G light source 31b has emitted light, and the other light sources have not emitted light. Furthermore, FIG. 7 shows that, at a time t(3), the B light source 31c has emitted light, and the other light sources have not emitted light.

Note that a time difference between marks (e.g., time from t(1) to t(2)) indicates the time necessary for the sheet S to advance by L.

In FIG. 6, the CPU 21 has a function (an interpolation unit 53) of performing interpolation between luminance of lines acquired using the same light source, based on the luminance data stored in the memory 22.

The CPU 21 selects one of the R light source 31a, the G light source 31b, and the B light source 31c, based on the random number. Accordingly, the CPU 21 may not acquire luminance of a color necessary to generate a color image, in a given line. For example, the CPU 21 may acquire luminance of a color (green or blue) other than red in a line where luminance of red has to be acquired. Accordingly, if luminance of a color necessary in a given line has not been acquired, the CPU 21 interpolates luminance of the color of the line, based on luminance of the color around the line. The interpolation processing will be described later in detail.

Furthermore, the CPU 21 has a function of determining a destination of the sheet S, based on an image formed from acquired luminance of each line.

For example, the CPU 21 determines the authenticity of the sheet S, based on the dictionaries stored in the dictionary storing unit 23. That is to say, the CPU 21 compares the image of the sheet S and the dictionaries, where, if the image of the sheet S matches one of the dictionaries, the CPU 21 determines that the sheet S is genuine and fit, and, if the image of the sheet S matches none of the dictionaries, the CPU 21 determines that the sheet S is not genuine or fit.

The CPU 21 determines the destination of the sheet S according to the authenticity of the sheet S. For example, if it is determined that the sheet S is genuine and fit, the CPU 21 determines the destination of the sheet S to be the stackers 19. On the other hand, if it is determined that the sheet S is not genuine or fit, the CPU 21 determines the destination of the sheet S to be the rejecting units 18.

Furthermore, the CPU 21 may determine the denomination of the sheet S, based on the dictionaries stored in the dictionary storing unit 23. That is to say, the CPU 21 compares the image of the sheet S and the dictionaries of respective denominations, thereby determining the denomination that matches the image of the sheet S. Note that the CPU 21 may determine the denomination of the sheet S, according to a bar code read by the bar code reader 17.

The CPU 21 determines the destination of the sheet S, according to the determination result of the denomination of the sheet S. For example, the CPU 21 determines the destination to be one of the stackers 19a, 19b, and 19c, according to the denomination of the sheet S.

Next, an operation example of the sheet processing apparatus 1 will be described.

Figure 8:
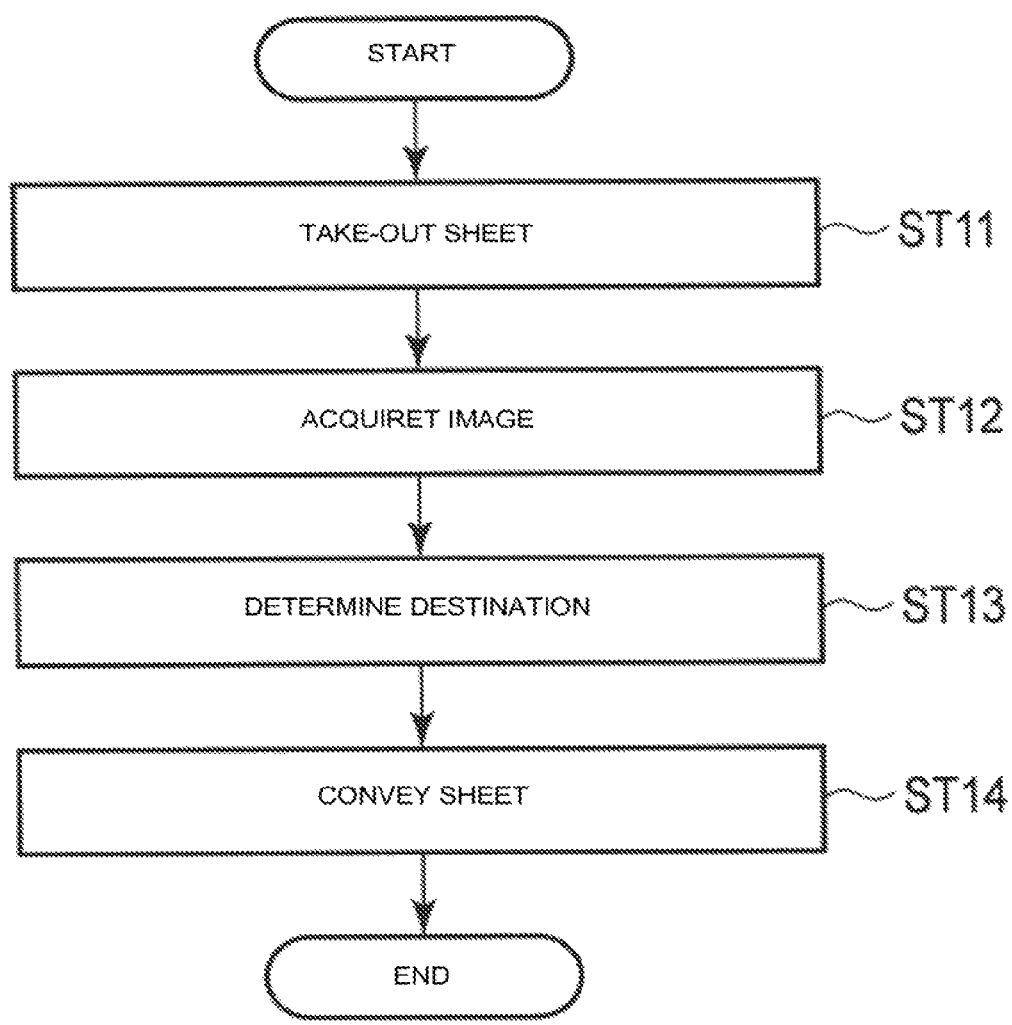
FIG. 8 is a flowchart showing an operation example of the sheet processing apparatus according to the first embodiment.

FIG. 8 is a flowchart illustrating an operation example of the sheet processing apparatus 1.

A plurality of sheets S can be stored in the supply unit 11 of the sheet processing apparatus 1. The sheet processing apparatus 1 sorts the sheets S stored in the supply unit 11. In this example, the CPU 21 of the image processing device 16 operates also as the controller of the sheet processing apparatus 1. Bills are used as the sheets S.

First, the CPU 21 causes the take-out unit 12 to take out the sheets S sheet by sheet from the supply unit 11 (ST11). After each of the sheets S is taken out, the CPU 21 causes the conveying unit 14 to convey the sheet S to the image processing device 16, and acquires an image of the sheet S (ST12). After the image of the sheet S is acquired, the CPU 21 determines the destination of the sheet S, based on the acquired image of the sheet S (ST13). After the destination is determined, the CPU 21 causes the conveying unit 14 to convey the sheet S to the determined destination (ST14). After the sheet S is conveyed to the determined destination, the CPU 21 ends the operation.

Note that the CPU 21 may successively take out and sort the sheets S. Furthermore, before ending the sorting of one sheet S, the CPU 21 may take out the next sheet S and start the sorting thereof.

Next, an operation example in which the image processing device 16 acquires an image of the sheet S will be described.

Figure 9:
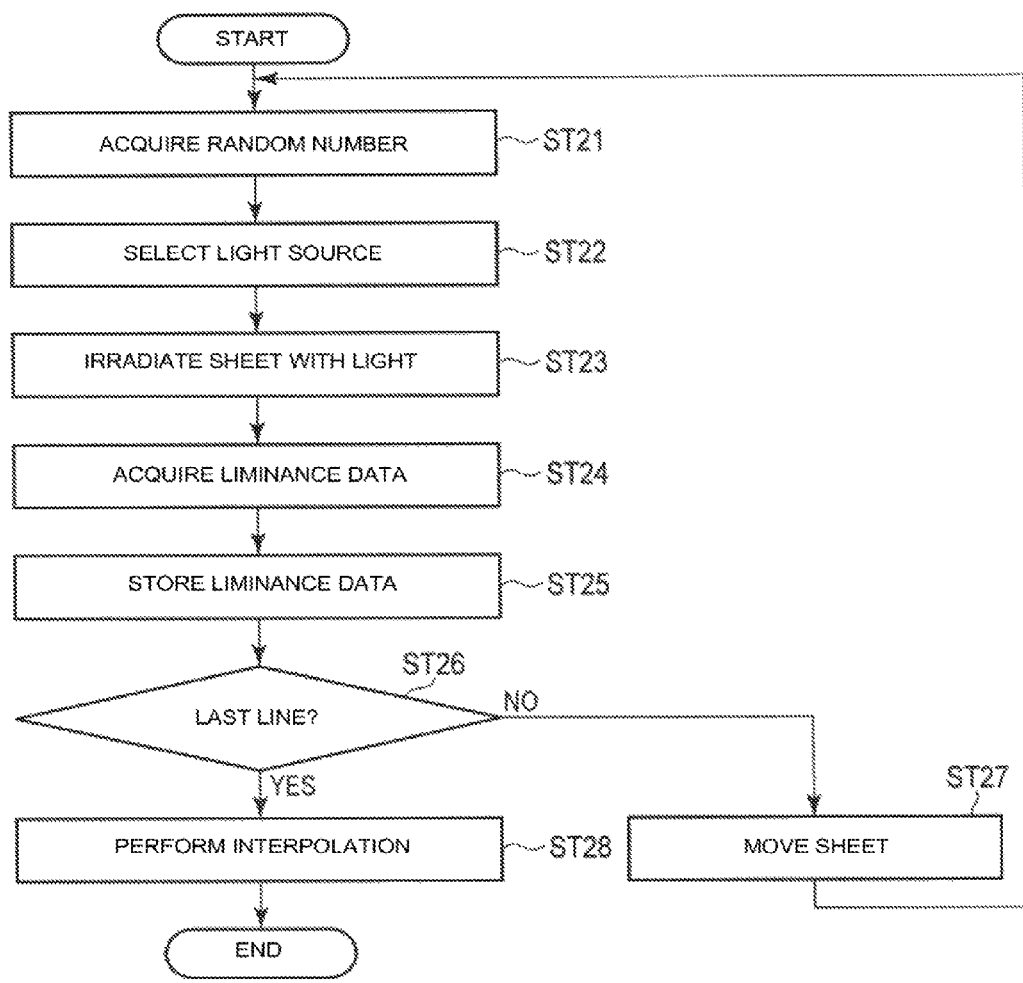
FIG. 9 is a flowchart showing an operation example of the image processing device according to the first embodiment.

FIG. 9 is a flowchart illustrating an operation example in which the image processing device 16 acquires an image of the sheet S.

In this example, it is assumed that the sheet S has been conveyed to a position at which the line sensor 27 of the image processing device 16 can read an image for one line from the sheet S.

First, the CPU 21 of the image processing device 16 acquires a random number using the random number generating unit 26 (ST21). For example, the random number generating unit 26 generates a random number in response to a random number generation command from the CPU 21, and supplies the generated random number to the CPU 21.

After the random number is acquired, the CPU 21 selects a light source corresponding to the acquired random number, with reference to the light source table (ST22). After the light source is selected, the CPU 21 causes the selected light source to emit light, thereby irradiating the sheet S with light from the selected light source (ST23).

In the state where the selected light source emits light, the CPU 21 causes the sensor unit 43 to receive light reflected from the sheet S, and photoelectrically converts the received light, thereby acquiring luminance data for one line (ST24).

After the luminance data of the light reflected from the sheet S is acquired, the CPU 21 stores the acquired luminance data in the memory 22 (ST25). After the luminance data is stored in the memory 22, the CPU 21 determines whether or not the line from which the luminance was acquired is the last reading line on the sheet S (ST26). The last reading line is the last line that is to be read from the sheet S. For example, the CPU 21 may determine whether or not the acquired line is the last reading line, by detecting the trailing edge of the sheet S using another sensor or the like.

If it is determined that the line from which the luminance data was acquired is not the last reading line (NO in ST26), the CPU 21 moves the sheet S by L (ST27). The CPU 21 may move the sheet S by L, by controlling the conveying unit 14. Furthermore, the CPU 21 may move the sheet S at a constant speed, and be put on standby while the sheet S is moving by L.

After the sheet S moves by L, the CPU 21 returns the procedure to ST21.

If it is determined that the line from which the luminance data was acquired is the last reading line (YES in ST26), the CPU 21 performs interpolation based on the acquired luminance data of each line (ST28). After the interpolation processing is performed, the CPU 21 ends the operation.

Next, the interpolation processing (ST28) will be described.

As described above, the interpolation processing interpolates luminance data of a given line from luminance data around the line.

Examples of methods for performing the interpolation processing include linear interpolation, non-linear interpolation, and the like. Linear interpolation is interpolation using a linear function. For example, the linear interpolation may be performed using a gradient between two points, a least-gradient method between a plurality of points, or the like. Non-linear interpolation may be performed using a polynomial expression according to a least-gradient method between a plurality of points, spline interpolation (piecewise polynomial interpolation), or the like. There is no particular limitation on the method for performing the interpolation processing.

Hereinafter, linear interpolation based on a gradient between two points will be described.

According to the interpolation processing, interpolation is started from a first line (earliest line), and continued up to a last line (latest line). In this example, it is assumed that the color of luminance acquired in a t-th line is $C[t]$, and the color of luminance required in the t-th line is C'[t]. Furthermore, it is assumed that the luminance of C[t] is I[t], and the luminance of C'[t] is I'[t].

Hereinafter, first linear interpolation will be described.

If the color of luminance acquired in a given line and the color of luminance required therein match each other, the CPU 21 determines that the acquired luminance is the required luminance.

That is to say, if C[t]=C'[t], the CPU 21 determines that:

$$I'[t]=I[t].$$

On the other hand, if the color of luminance acquired in a given line and the color of luminance required therein do not match each other, the required luminance of the t-th line is interpolated by connecting luminance before and after the line using a linear function. In this example, it is assumed that a t1-th line is a line of C'[t] that is the closest to the t-th line among the lines before the t-th line, and a t1-th line is a line of C'[t] that is the closest to the t-th line among the lines after the t-th line.

That is to say, if C[t] ≠ C'[t], the CPU 21 determines that:

$$I'[t]=I[t]+(I[t2]-I[t1])\times(t-t1)/(t2-t1) \quad \text{Equation (1)}.$$

Figure 10:
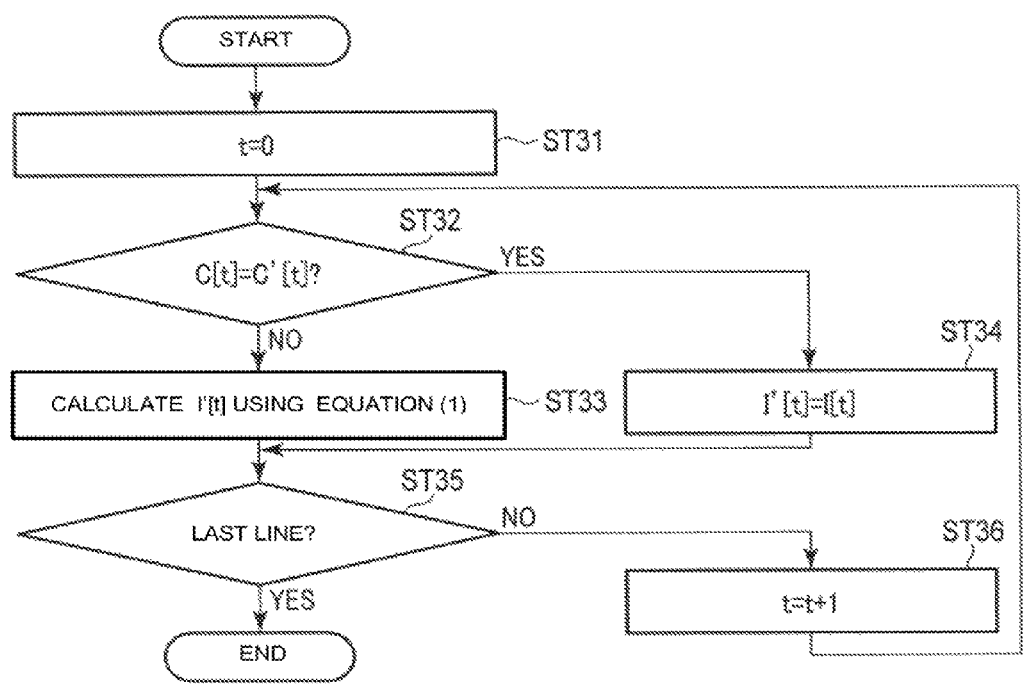
FIG. 10 is a flowchart showing an operation example of the image processing device according to the first embodiment.

FIG. 10 is a flowchart showing an operation example of the first interpolation processing.

First, the CPU 21 resets a variable t to 0 (ST31). After the variable t is reset, the CPU 21 determines whether or not C[t]=C'[t] is satisfied (ST32).

If it is determined that C[t]=C'[t] is not satisfied (NO in ST32), the CPU 21 calculates I'[t] using Equation (1) (ST33).

If it is determined that C[t]=C'[t] is satisfied (YES in ST32), the CPU 21 determines that I'[t]=I[t] (ST34).

If I'[t] is calculated using Equation (1) (ST33) or if it is determined that [t]=I[t] (ST34), the CPU 21 determines whether or not the t-th line is the last line (ST35).

If it is determined that the t-th line is not the last line (NO in ST35), the CPU 21 increments the variable t (adds 1 to t) (ST36). After the variable t is incremented, the CPU 21 returns the procedure to ST32.

If it is determined that the t-th line is the last line (YES in ST35), the CPU 21 ends the operation of the first interpolation processing.

Next, second linear interpolation will be described.

If the color of luminance acquired in a given line and the color of luminance required therein match each other, the CPU 21 determines that the acquired luminance data is the required luminance data.

For example, if C[t]=C'[t], the CPU 21 determines that:

$$I'[t]=I[t].$$

On the other hand, if the color of luminance acquired in a given line and the color of luminance required therein do not match each other, the CPU 21 determines whether or not both of the difference between t and t1 and the difference between t2 and t are smaller than a predetermined value α. If both of the difference between t and t1 and the difference between t2 and t are smaller than the predetermined value α, the CPU 21 calculates I'[t] using Equation (1).

That is to say, if C[t] ≠ C'[t], t−t1<α, and, t2−t<α, the CPU 21 determines that:

$$I'[t]=I[t]+(I[t2]-I[t1])\times(t-t1)/(t2-t1) \quad \text{Equation (1)}.$$

On the other hand, if the difference between t2 and t is at the predetermined value α or more and the difference between t and t1 is smaller than α, the CPU 21 interpolates the luminance of the t-th line by connecting the luminance of C'[t] before t1-th line and the luminance at t1-th line using a linear function. In this example, it is assumed that a t1'-th line is a line of C'[t] that is the closest to t1-th line among the lines before t1-th line.

That is to say, if C[t] ≠ C'[t], t−t1<α, and, t2−t≥α, the CPU 21 determines that:

$$I'[t]=I[t1']+(I[t1]-I[t1'])\times(t1-t1')/(t1-t1') \quad \text{Equation (2)}.$$

On the other hand, if the difference between t and t1 is at the predetermined value α or more and the difference between t2 and t is smaller than α, the CPU 21 interpolates the luminance of the t-th line by connecting the luminance of C'[t] after t2-th line and the luminance at t2-th line using a linear function. In this example, it is assumed that a t2'-th line is a line of C'[t] that is the closest to t2-th line among the lines after t2-th line.

That is to say, if C[t] ≠ C'[t], t−t1≥α, and, t2−t<α, the CPU 21 determines that:

$$I'[t]=I[t2']+(I[t2']-I[t2])\times(t-t2')/(t2'-t2) \quad \text{Equation (3)}.$$

On the other hand, if both of the difference between t and t1 and the difference between t2 and t are at the predetermined value α or more, the CPU 21 determines that interpolation is impossible.

Figure 11:
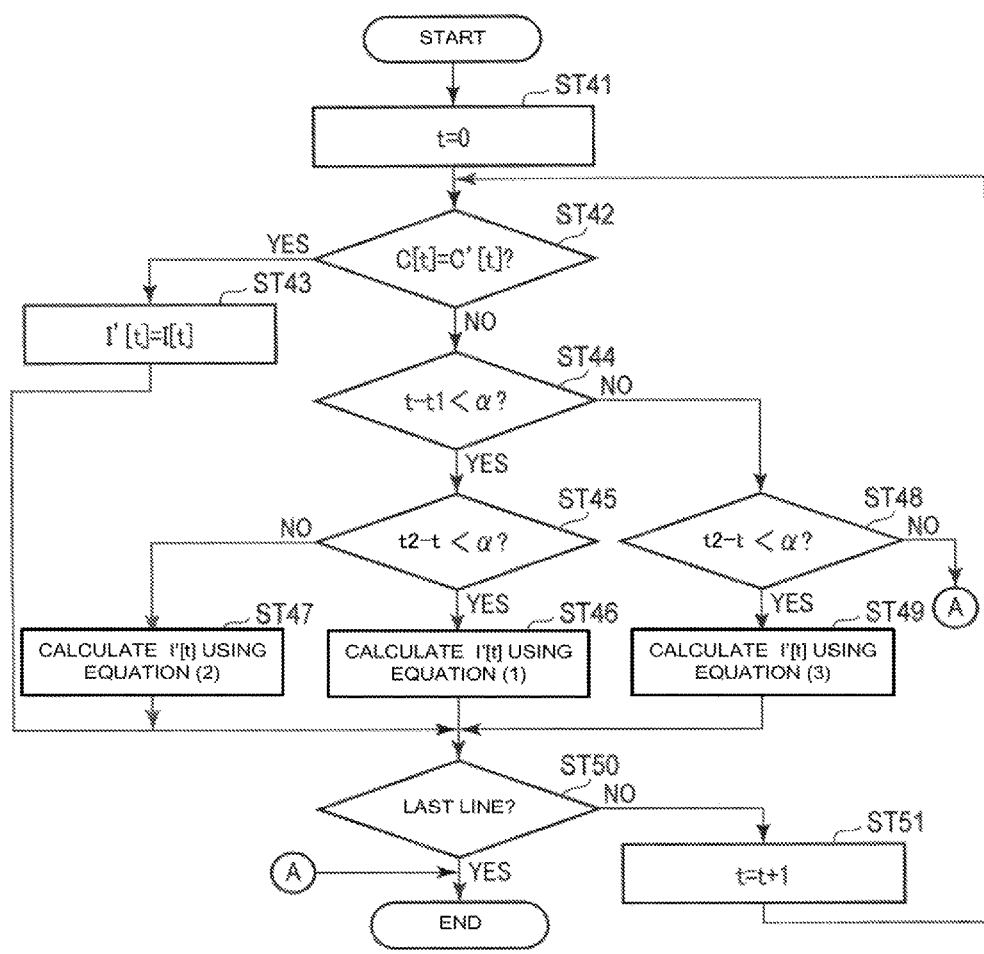
FIG. 11 is a flowchart showing an operation example of the image processing device according to the first embodiment.

FIG. 11 is a flowchart showing an operation example of the second interpolation processing.

First, the CPU 21 resets the variable t to 0 (ST41). After the variable t is reset, the CPU 21 determines whether or not C[t]=C'[t] is satisfied (ST42).

If it is determined that C[t]=C'[t] is satisfied (YES in ST42), the CPU 21 determines that I'[t]=I[t] (ST43).

If it is determined that C[t]=C'[t] is not satisfied (NO in ST42), the CPU 21 determines whether or not t−t1<α is satisfied (ST44).

If it is determined that t−t1<α is satisfied (YES in ST44), the CPU 21 determines whether or not t2−t<α is satisfied (ST45).

If it is determined that t2−t<α is satisfied (YES in ST45), the CPU 21 calculates I'[t] using Equation (1) (ST46).

If it is determined that t2−t<α is not satisfied (NO in ST45), the CPU 21 calculates I'[t] using Equation (2) (ST47).

If it is determined that t−t1<α is not satisfied (NO in ST44), the CPU 21 determines whether or not t2−t<α is satisfied (ST48).

If it is determined that t2−t<α is satisfied (YES in ST48), the CPU 21 calculates I'[t] using Equation (3) (ST49).

If it is determined that I'[t]=I[t] (ST43), if I'[t] is calculated using Equation (1) (ST46), if I'[t] is calculated using Equation (2) (ST47), or if I'[t] is calculated using Equation (3) (ST49), the CPU 21 determines whether or not the t-th line is the last line (ST50).

If it is determined that the t-th line is not the last line (NO in ST50), the CPU 21 increments t (adds 1 to t) (ST51). After the variable t is incremented, the CPU 21 returns the procedure to ST42.

If it is determined that t2−t<α is not satisfied (NO in ST48) or if it is determined that the t-th line is the last line (YES in ST50), the CPU 21 ends the operation.

Figure 12:
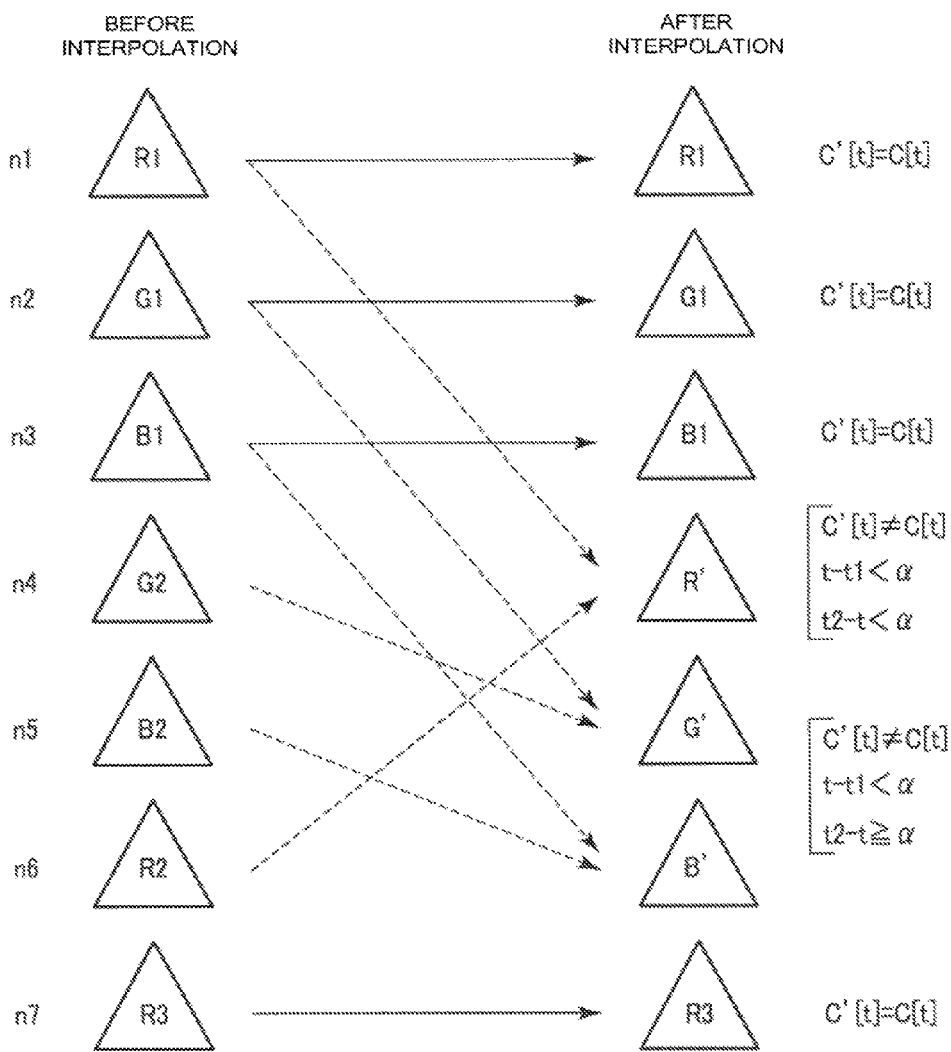
FIG. 12 is a diagram showing an example of interpolation according to the first embodiment.

FIG. 12 is a diagram showing an example of interpolation using the second interpolation processing.

FIG. 12 illustrates interpolation of n1-th to n7-th lines.

In this example, luminance of red (R) is required in the n1-th, n4-th, and n7-th lines, luminance of green (G) is required in the n2-th and n5-th lines, and luminance of blue (B) is required in the n3-th and n6-th lines.

In the n1-th, n2-th, n3-th, and n7-th lines, the color of the acquired luminance data and the color of the required luminance data match each other (i.e., C[t]=C'[t]), and, thus, the CPU 21 determines that I'[t]=I[t].

In the n4-th line, the color of the acquired luminance data is green, whereas the color of the required luminance data is red. Accordingly, the n4-th line is interpolated from the luminance of other lines. In this example, the color of the luminance data acquired in the n1-th and n6-th lines is red. Furthermore, it is assumed that both of the difference between n1 and n4 and the difference between n6 and n4 are smaller than the predetermined value $\alpha$. Accordingly, luminance data of the n4-th line is calculated using Equation (1) based on the luminance of the n1-th and n6-th lines.

Furthermore, in the n5-th line, the color of the acquired luminance data is blue, whereas the color of the required luminance data is green. Accordingly, the n5-th line is interpolated from the luminance data of other lines. In this example, the color of the luminance data acquired in the n2-th and n4-th lines is green. Furthermore, it is assumed that both the difference between n2 and n5 and the difference between n4 and n5 are smaller than the predetermined value $\alpha$. Furthermore, it is assumed that a green line that is the closest to n5 among the lines after n5 is away from n5 by a or more. Accordingly, luminance data of the n5-th line is calculated using Equation (2) based on the luminance data of the n2-th and n4-th lines. Similar operations are performed also on the n6-th line.

Note that the image processing device 16 may acquire luminance data of each line while moving the line sensor 27 along the sheet S in a state where the sheet S is stopped. Furthermore, the illuminator 31 may be configured by a light source that can irradiate light of a plurality of colors.

The thus configured image processing device causes the R light source, the G light source, and the B light source to emit light according to a random number, in each line, and acquires luminance from each line. As a result, the image processing device can acquire luminance of red (R), green (G), and blue (B) at random from each line. Thus, according to the image processing device, moire is prevented from occurring due to the acquiring luminance of red (R), green (G), and blue (B) at constant sampling intervals.

Second Embodiment

Next, a second embodiment will be described.

The sheet processing apparatus 1 of the second embodiment is different from the sheet processing apparatus 1 of the first embodiment in that a light source is selected according to a predetermined random number. Accordingly, the other constituent elements are denoted by the same reference numerals and a detailed description thereof has been omitted.

Figure 13:
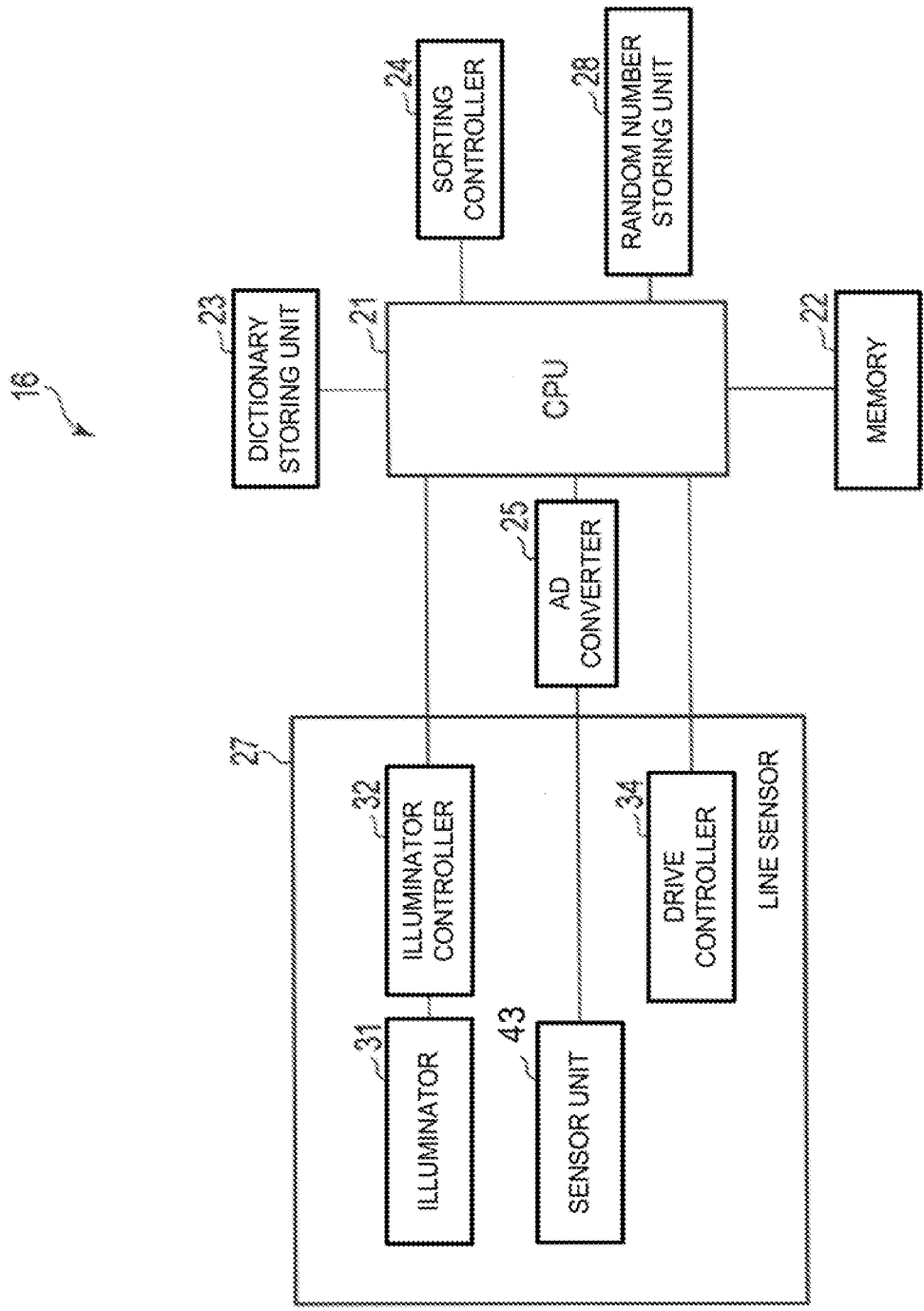
FIG. 13 is a block diagram showing a configuration example of an image processing device according to a second embodiment.

FIG. 13 is a block diagram showing a configuration example of the image processing device 16 according to the second embodiment.

The image processing device 16 according to the second embodiment is different from the image processing device 16 according to the first embodiment in that a random number storing unit 28 is provided instead of the random number generating unit 26. Accordingly, the other constituent elements are denoted by the same reference numerals and a detailed description thereof has been omitted.

The random number storing unit 28 stores a random number sequence. That is to say, the random number storing unit 28 stores a predetermined number of random numbers. The random number storing unit 28 stores random numbers necessary to acquire luminance from each line of the sheet S. That is to say, the random number storing unit 28 stores the number of random numbers, that is equal to or more than the number of the lines from which luminance is to be acquired.

Each of the random numbers stored in the random number storing unit 28 is a value in the range corresponding to the number of light sources included in the illuminator 31. In this example, since the illuminator 31 includes three light sources, the random number storing unit 28 stores the random numbers 1 to 3.

Before the CPU 21 acquires luminance data from the sheet S, a random number sequence is stored in advance in the random number storing unit 28. For example, the random number sequence may be stored in the random number storing unit 28 in the production of the sheet processing apparatus 1. Furthermore, the random number sequence stored in the random number storing unit 28 may be updated during the operation of the sheet processing apparatus 1. Furthermore, new random number sequences generated by the CPU 21 or the like may be stored in the random number storing unit 28, for example, when the sheet processing apparatus 1 is powered on.

The random number storing unit 28 may be disposed in the memory 22.

Next, the functions realized by the CPU 21 will be described.

The CPU 21 has a function of acquiring a random number from the random number storing unit 28.

The CPU 21 sequentially acquires a random number from the random number storing unit 28 each time luminance for one line is acquired from the sheet S. The CPU 21 sequentially acquires a random number from the random number storing unit 28 each time the sheet S moves by the distance L.

Next, an operation example in which the image processing device 16 acquires an image of the sheet S will be described.

Figure 14:
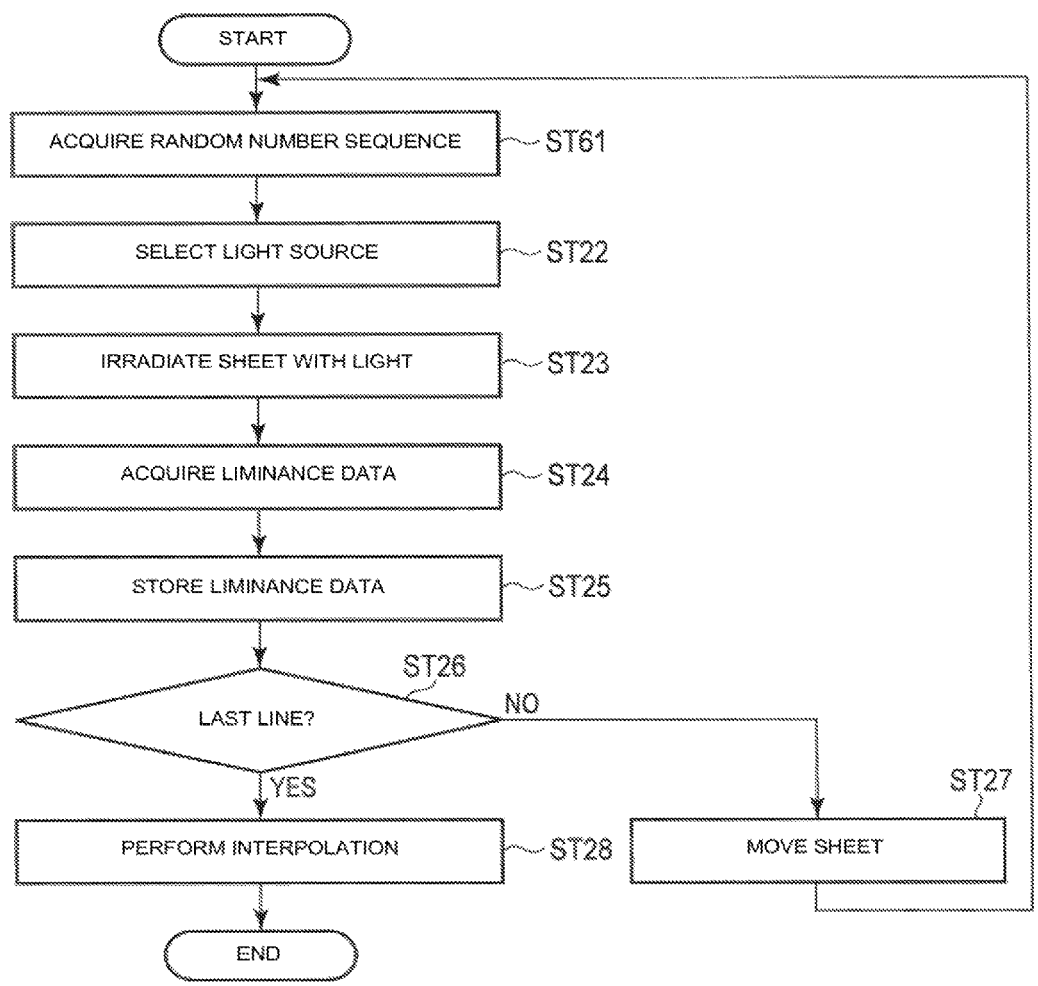
FIG. 14 is a flowchart showing an operation example of the image processing device according to the second embodiment.

FIG. 14 is a flowchart illustrating an operation example in which the image processing device 16 acquires an image of the sheet S.

In this example, it is assumed that the sheet S has been conveyed to a position at which the line sensor 27 of the image processing device 16 can read a line from the sheet S.

First, the CPU 21 of the image processing device 16 acquires a random number from the random number storing unit 28 (ST61). After the random number is acquired, the CPU 21 selects a light source corresponding to the acquired random number, with reference to the light source table (ST22).

After the CPU 21 moves the sheet S by the distance L (ST27), the CPU 21 returns the procedure to ST61. That is to say, the CPU 21 acquires the next random number from the random number storing unit 28 (ST61).

The steps ST22 to 28 are similar to those in the first embodiment, and, thus, a description thereof has been omitted.

Note that the random number storing unit 28 may store a plurality of random number sequences. The CPU 21 may select one of the plurality of random number sequences, and select a light source using the selected random number sequence.

The thus configured sheet processing apparatus can select a light source using a random number sequence generated in advance. Accordingly, the sheet processing apparatus does not have to have a function of generating a random number.

Accordingly, the operation cost, the production cost, and/or the like of the sheet processing apparatus can be reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device for acquiring an image from an object, comprising:
    an illuminator having a plurality of light sources configured to irradiate light of respectively different colors onto an object;
    a sensor configured to output luminance data for one line obtained by photoelectrically converting light that is reflected from the object of light that was irradiated by the illuminator onto the object; and
    circuitry configured to acquire a random number, and acquire luminance data for one line output by the sensor, while causing one light source selected from the plurality of light sources based on the random number acquired to emit light.

2. The image processing device according to claim 1, wherein the circuitry is further configured to
    to generate a random number,
    acquire the generated random number from the random number.

3. The image processing device according to claim 1, further comprising:
    a memory configured to store a random number sequence;
    wherein the circuitry acquires the random number from the memory.

4. The image processing device according to claim 1, further comprising:
    a memory configured to store a light source table in which the plurality of light sources are respectively associated with random number values;
    wherein the circuitry selects a light source according to a value of the random number acquired based on the light source table.

5. The image processing device according to claim 1, further comprising:
    a memory configured to store the luminance data of a plurality of lines acquired by the circuitry;
    wherein, in a case where luminance data of a given line is not luminance of a predetermined color, the circuitry interpolates the luminance of the given line, based on the luminance data of a plurality of lines representing luminance of the predetermined color stored in the memory.

6. The image processing device according to claim 5, wherein the circuitry performs linear interpolation on the luminance.

7. The image processing device according to claim 1, wherein the illuminator comprises a first light source for irradiating red light, a second light source for irradiating green light, and a third light source for irradiating blue light.

8. The image processing device according to claim 1, wherein the circuitry determines a type of the object based on an image formed from the luminance of each line.

9. An article processing apparatus, comprising:
    an image processing device including:
        an illuminator having a plurality of light sources configured to irradiate light of respectively different colors onto an object;
        a sensor configured to output luminance data for one line obtained by photoelectrically converting light that is reflected from the object of light that was irradiated by the illuminator onto the object; and
        a circuitry configured to acquire a random number, and acquire luminance data for one line output by the sensor, while causing one light source selected from the plurality of light sources based on the random number acquired to emit light;
    a feeder configured to supply the object onto a conveyor; and
    the conveyor configured to convey the object taken out from the feeder to the image processing device.

10. The article processing apparatus according to claim 9, wherein the circuitry determines a destination of the object based on an image formed from the luminance of each line.

11. An image processing method used in an image processing device having the illuminator having a plurality of light sources configured to irradiate light of respectively different colors onto an object, and a sensor configured to output luminance data for one line obtained by photoelectrically converting light that is reflected from the object of light that was irradiated by an illuminator onto the object, comprising:
    acquiring a random number;
    selecting one light source from the plurality of light sources based on the acquired random number; and
    acquiring luminance data for one line output by the sensor, while causing the selected light source to emit light.

12. The image processing method according to claim 11, further comprising:
    storing the luminance data of a plurality of lines output by the sensor; and
    in a case where luminance data of a given line is not luminance of a predetermined color, interpolating the luminance of the given line, based on the stored luminance data of a plurality of lines representing luminance of the predetermined color.

13. An image processing device for acquiring an image from an object, comprising:
    an illuminator having a plurality of light sources configured to irradiate light of respectively different colors onto an object;
    a sensor unit configured to output luminance data for one line obtained by photoelectrically converting light that is reflected from the object of light that was irradiated by the illuminator onto the object; and
    a controller configured to acquire a random number, and acquire luminance data for one line output by the sensor unit, while causing one light source selected from the plurality of light sources based on the random number acquired to emit light.

* * * * *